United States Patent [19]
Healy et al.

[11] Patent Number: 5,727,449
[45] Date of Patent: Mar. 17, 1998

[54] AUTOMATIC BASTING ROASTER

[76] Inventors: Jack Healy, 11333 Moorpark St., #128, Toluca Lake, Calif. 91602; Gregg A. Bond, 3223 Philo St., Los Angeles, Calif. 90064

[21] Appl. No.: 800,135

[22] Filed: Feb. 13, 1997

[51] Int. Cl.$^6$ ............................................. A47J 37/00
[52] U.S. Cl. ............................................ 99/346; 99/347
[58] Field of Search .................... 99/330–332, 339, 99/340, 341, 345–347, 352, 355, 426, 402, 448, 450, 516, 534–536; 426/509–511, 523, 438, 439

[56] References Cited

U.S. PATENT DOCUMENTS

| | | | |
|---|---|---|---|
| 1,349,302 | 8/1920 | Spitz | 99/346 |
| 1,700,614 | 1/1929 | Moore | 99/346 |
| 2,142,800 | 1/1939 | Olexsy | 99/346 |
| 2,343,156 | 2/1944 | Penick | 99/346 |
| 2,350,623 | 6/1944 | Kruea | 99/419 |
| 2,400,405 | 5/1946 | Getgey et al. | 99/346 |
| 2,560,605 | 7/1951 | Shell | 99/346 |
| 2,724,323 | 11/1955 | Hemminger et al. | 99/299 |
| 3,053,166 | 9/1962 | Ashley | 99/346 |
| 3,412,673 | 11/1968 | Landis | 99/346 |
| 3,922,960 | 12/1975 | Lewis | 99/345 X |
| 4,732,137 | 3/1988 | Parsons | 99/347 X |
| 5,421,254 | 6/1995 | McDonald | 99/346 |

*Primary Examiner*—Timothy F. Simone
*Attorney, Agent, or Firm*—Oppenheimer Poms Smith

[57] ABSTRACT

An automatic basting roaster including a main roasting pan, a basting pan disposed in the roasting pan, and a rack holding a roast removably mounted on the basting pan. A drip pan is supported above the rack and the area in the roasting pan between the basting pan and the bottom of the roasting pan acts as a valve controlled basting fluid supply chamber sealed off from the atmosphere except for tubing extending into the liquid therein opening a short distance above the bottom of the roasting pan and opening above and onto the top of the drip pan.

13 Claims, 7 Drawing Sheets

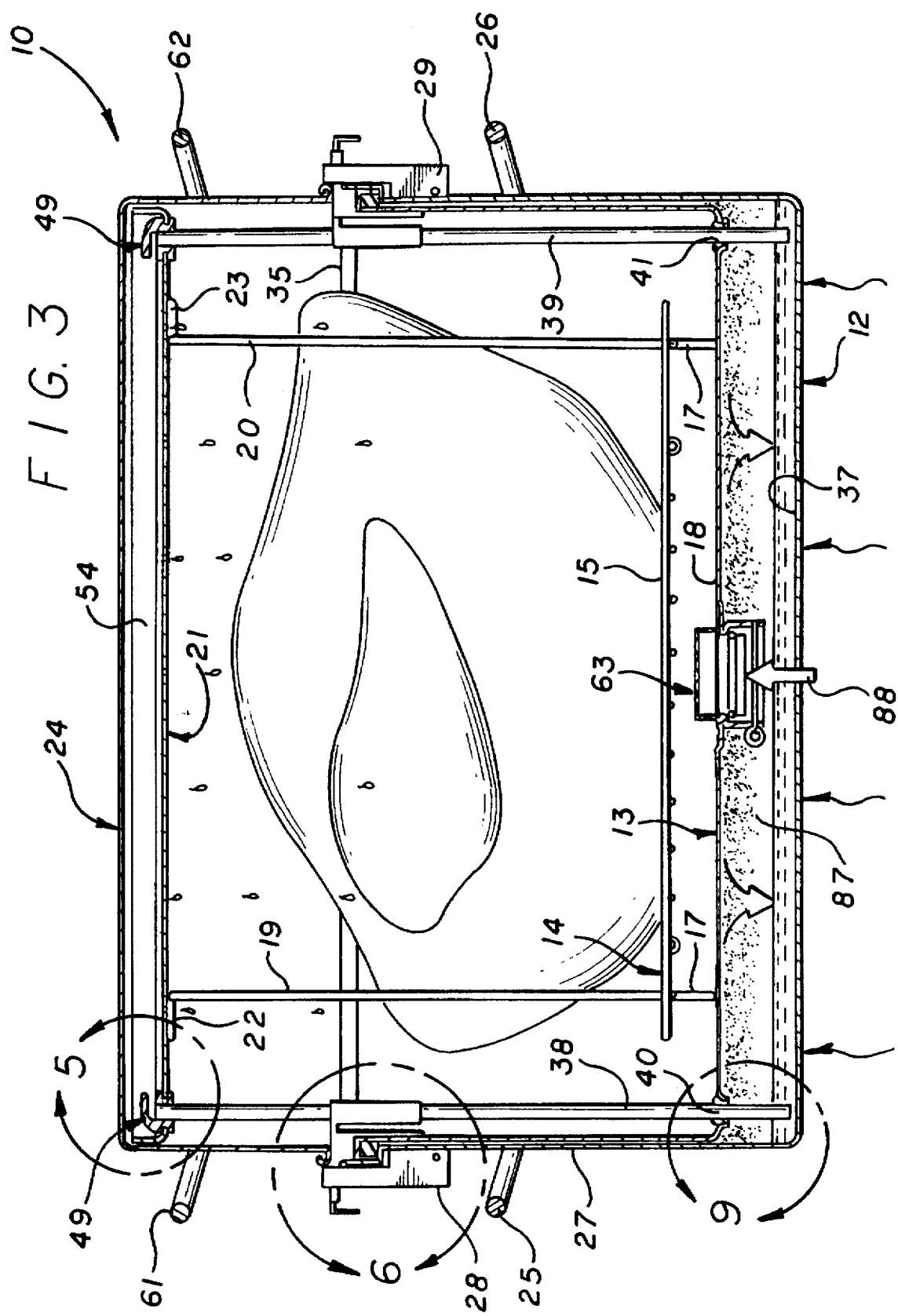

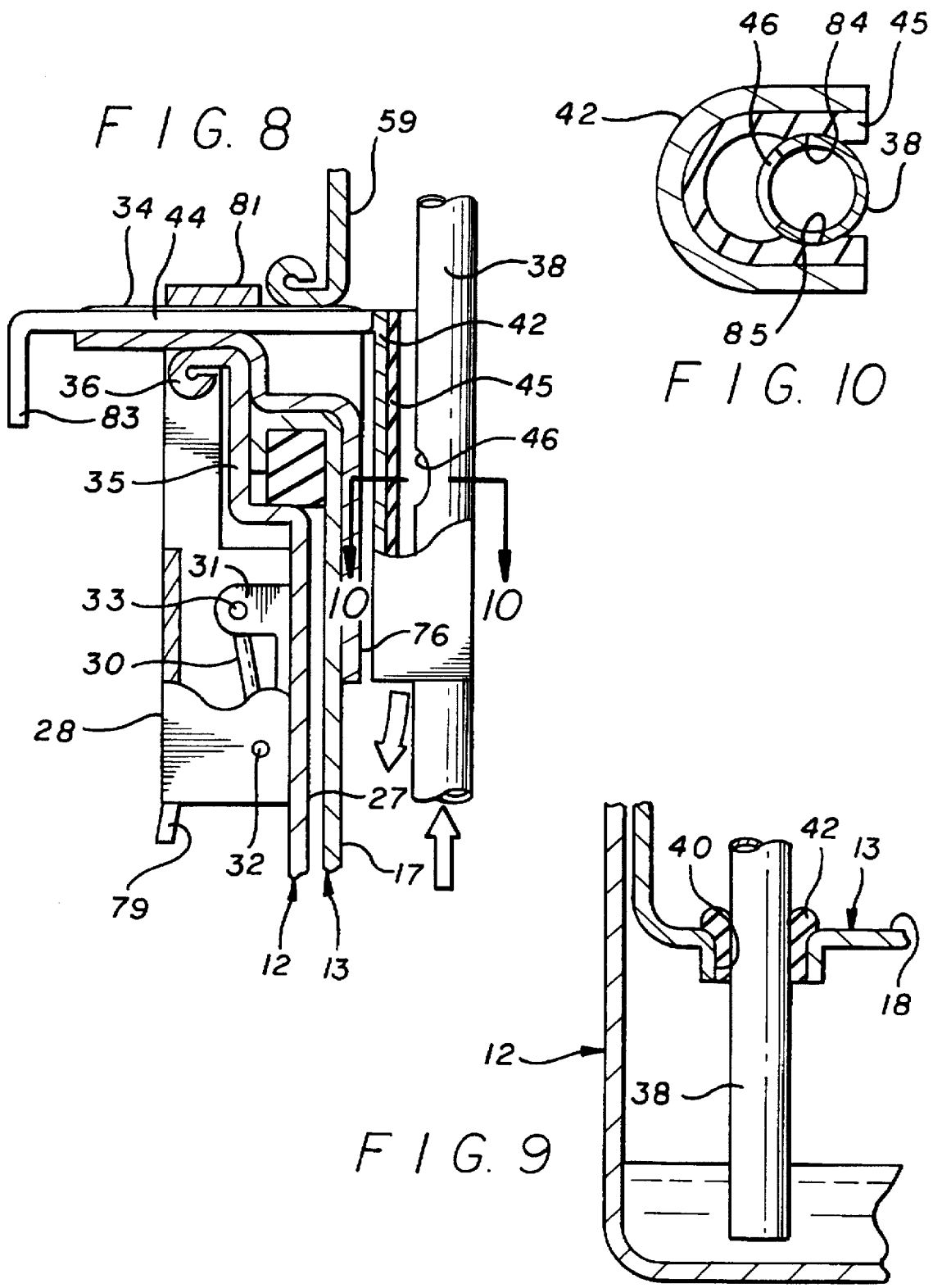

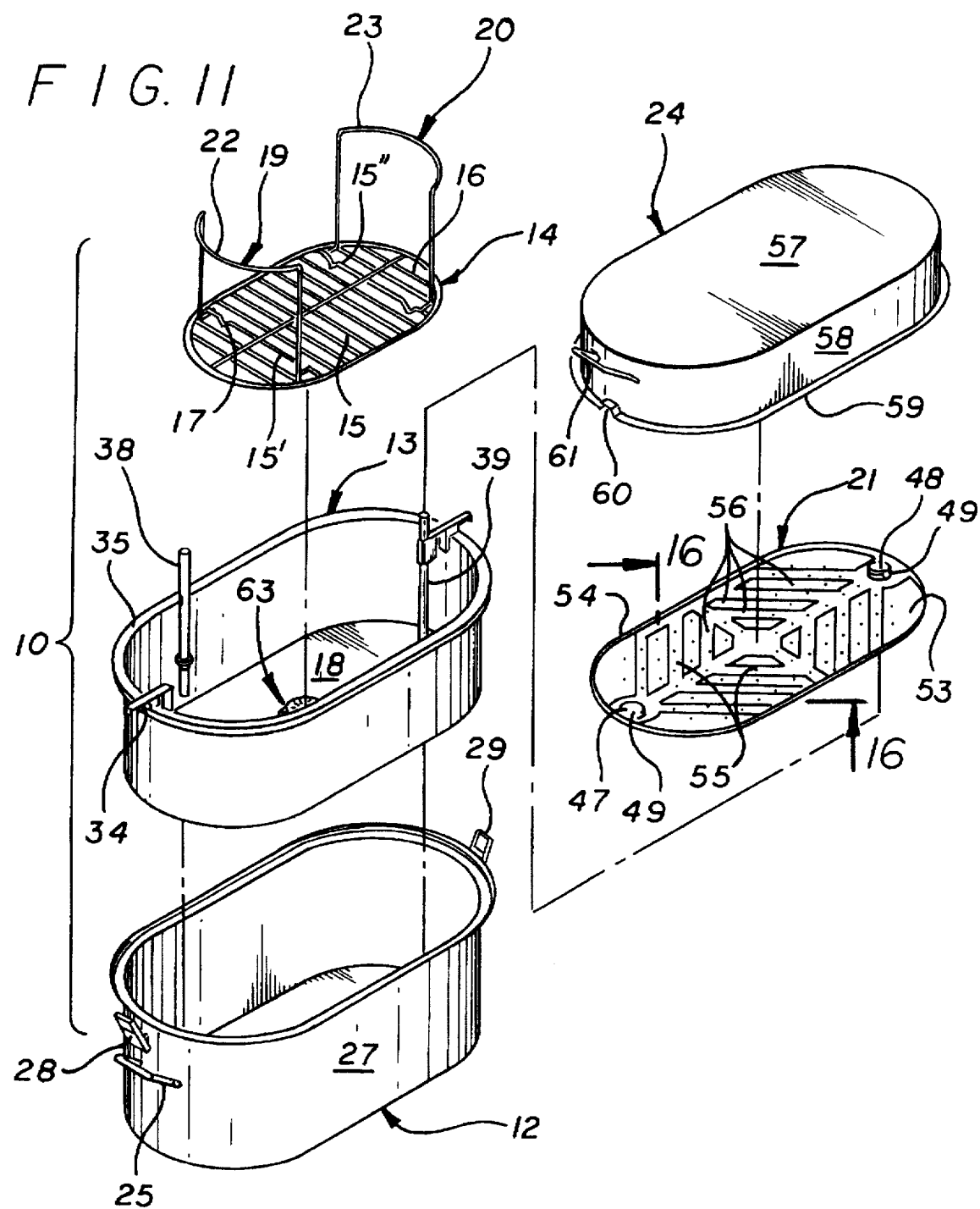

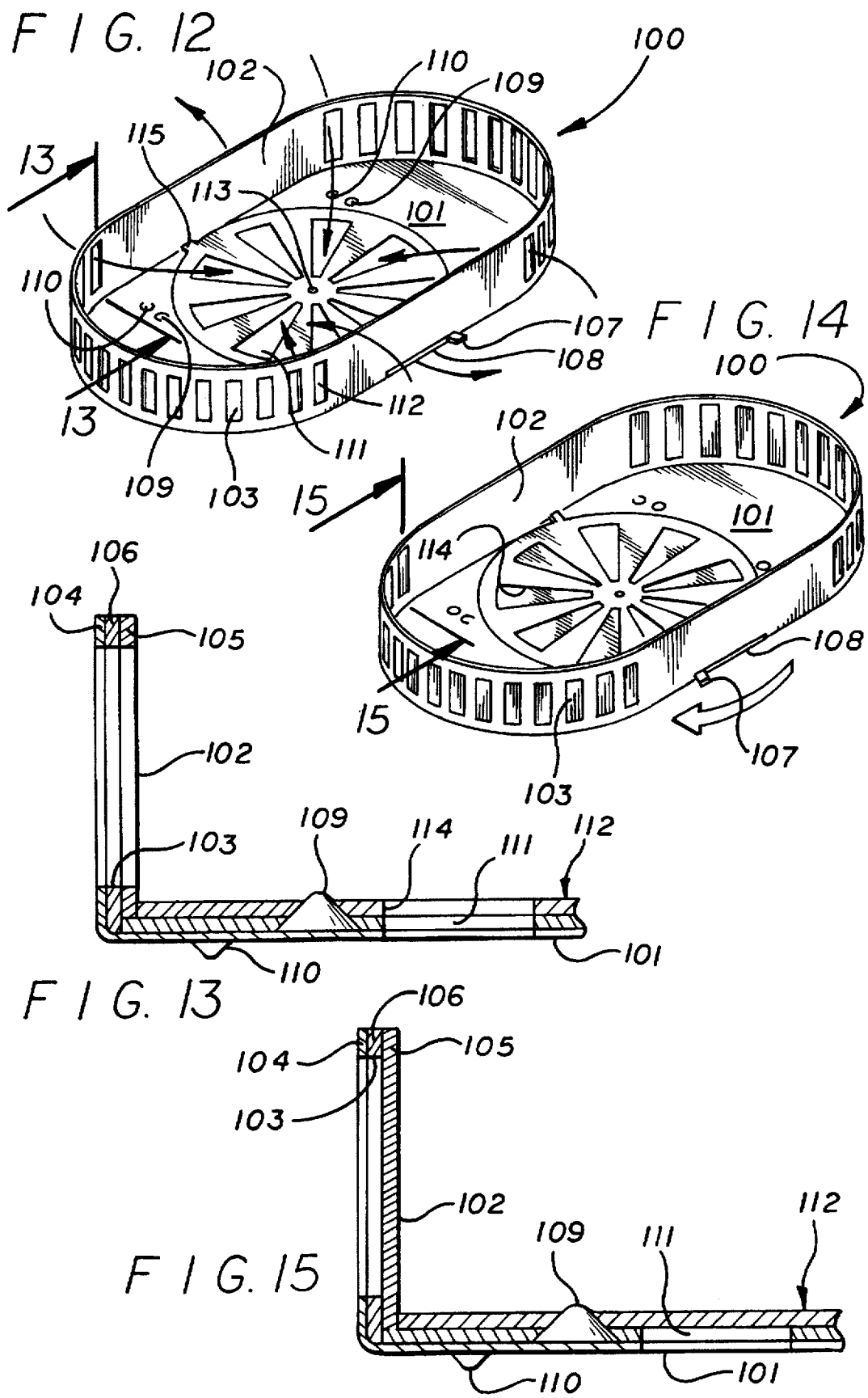

5,727,449

1
AUTOMATIC BASTING ROASTER

BACKGROUND OF THE INVENTION

The invention relates to roasting; and, more particularly, to automatically basting roasters.

FIELD OF THE INVENTION

DESCRIPTION OF THE PERTINENT ART

Automatic roasters for self basting roasts and the like have been suggested in the past. Some such devices are disclosed in the following patents: U.S. Pat. Nos. 2,142,800; 2,350,623; 2,343,156; 2,400,405; 2,560,605; 2,724,323; and 5,421,254. None of these roasters work efficiently since sufficient heat to cause percolation in an oven atmosphere is not available due to evaporation of liquid in the roasting pan prior to reaching the boiling point. None of the foregoing patents use a valve to seal off the percolation chamber from evaporation. Such sealing off would provide sufficient convection heat in a 350° F. to 400° oven to cause percolation as long as the percolation chamber cannot dissipate heat by way of evaporation. There is thus a need for an automatic basting roaster using a valve controlled percolation chamber for providing sufficient convection heat to self baste a roast or the like.

SUMMARY OF THE INVENTION

It is an object of this invention to provide a self basting roaster for using percolation during the roasting process to self baste a roast or the like.

It is a further object of this invention to provide a self basting roaster having a valve controlled basting fluid supply chamber sealed from the atmosphere except for tubing opening at one end into the liquid in the chamber and at the other end on to a drip pan above the roast.

It is a principal object of this invention to provide a self basting roaster capable of operation in the low heat environment of an oven.

These and other objects are preferably accomplished by providing an automatic basting roaster including a main roasting pan, a basting pan disposed in the roasting pan, and a rack holding a roast removable mounted on the basting pan. A drip pan is supported above the rack and the area in the roasting pan between the basting pan and the bottom of the roasting pan acts as a basting fluid supply chamber sealed off from the atmosphere except for tubing extending into the liquid therein opening at one end a short distance above the bottom of the roasting pan and opening at the other end above and onto the top of the drip pan. The basting fluid supply chamber at the bottom of the roasting pan is valve controlled so that, when the valve is open and the chamber fills with liquid from the basting pan reservoir formed between the rack and the basting pan, the liquid rises above the open bottom of the tubing forming a trap which liquid rises in the chamber until the valve closes. At this time, the liquid in the chamber, which is below boiling, begins to heat up forming pressure therein (since the heated liquid can't evaporate due to the chamber being sealed) generating steam which pushes liquid in the chamber up the tubing and out over the top of the drip pan. This liquid drips down over the roast basting the same and dripping back into the basting pan reservoir. This continues until the liquid level in the chamber reaches the open bottom of the tubing at which point the pressure of the steam above the liquid in the chamber escapes up the tubing until the pressure in the chamber drops and the valve opens. The cycle is then repeated.

2
BRIEF DESCRIPTION OF THE DRAWING

FIG. 3 is an assembled view, partly in section, of the roaster alone of FIG. 1;

FIG. 8 is a view similar to FIG. 6 showing an alternate position thereof;

FIG. 9 is a view taken along line 9 of FIG. 3;

FIG. 10 is a view taken along lines 10—10 of FIG. 8;

FIG. 11 is an exploded view of the roaster alone of FIG. 1;

FIG. 12 is a perspective view of an accessory to be used with the roaster of FIG. 1;

FIG. 13 is a view taken along lines 13—13 of FIG. 12;

FIG. 14 is a view similar to FIG. 12 showing movement of the parts thereof;

FIG. 15 is a view taken along lines 15—15 of FIG. 14;

DESCRIPTION OF THE PREFERRED EMBODIMENT

Figure 1:
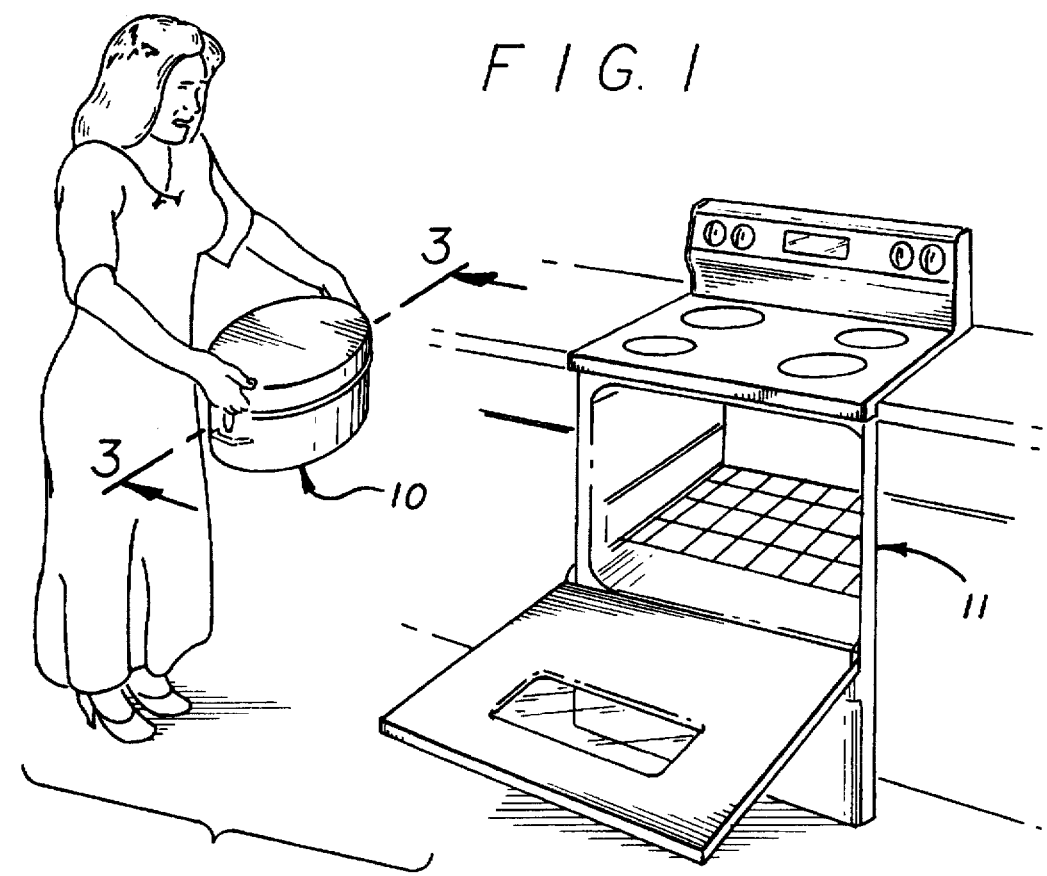
FIG. 1 is a perspective view illustrating use of the roaster of the invention.

Referring now to FIG. 1 of the drawing, a self basting roaster 10 is shown about to be placed in oven 11. Roaster 10 is shown in exploded view in FIG. 11. Roaster 10 thus includes a main roasting pan 12 which is adapted to receive therein a basting pan 13 (see also FIG. 3). A rack 14 (FIG. 11) is mounted inside of pan 12 on top of pan 12 as seen in FIG. 3. As seen in FIG. 11, rack 14 has an elongated oval-shaped main body portion 15 in the form a grid providing by a plurality of spaced rods 16. Two of these rods, such as rods 15', 15", have downwardly extending generally V-shaped portions 17 for supporting rack 14 inside of basting pan 13 and spacing the same from the bottom wall 18 thereof as seen in FIG. 3. Rack 14 also has a pair of spaced handles 19, 20 extending upwardly from main body portion 15 and providing a support for a drip pan 21 (see also FIG. 11) adapted to rest on top of the curved integral bail portions 22, 23 of handles 19, 20, respectively, as seen in FIG. 3. Finally, roaster 10 is closed off by a top cover 24 (see also FIG. 11).

Roasting pan 12 has a pair of integral carrying handles 25, 26 (see also FIG. 3) extending outwardly from the side wall 27 thereof and a pair of latch members 28, 29 integral with side wall 27 of pan 12 and extending outwardly therefrom above handles 25, 26, respectively.

Figure 6:
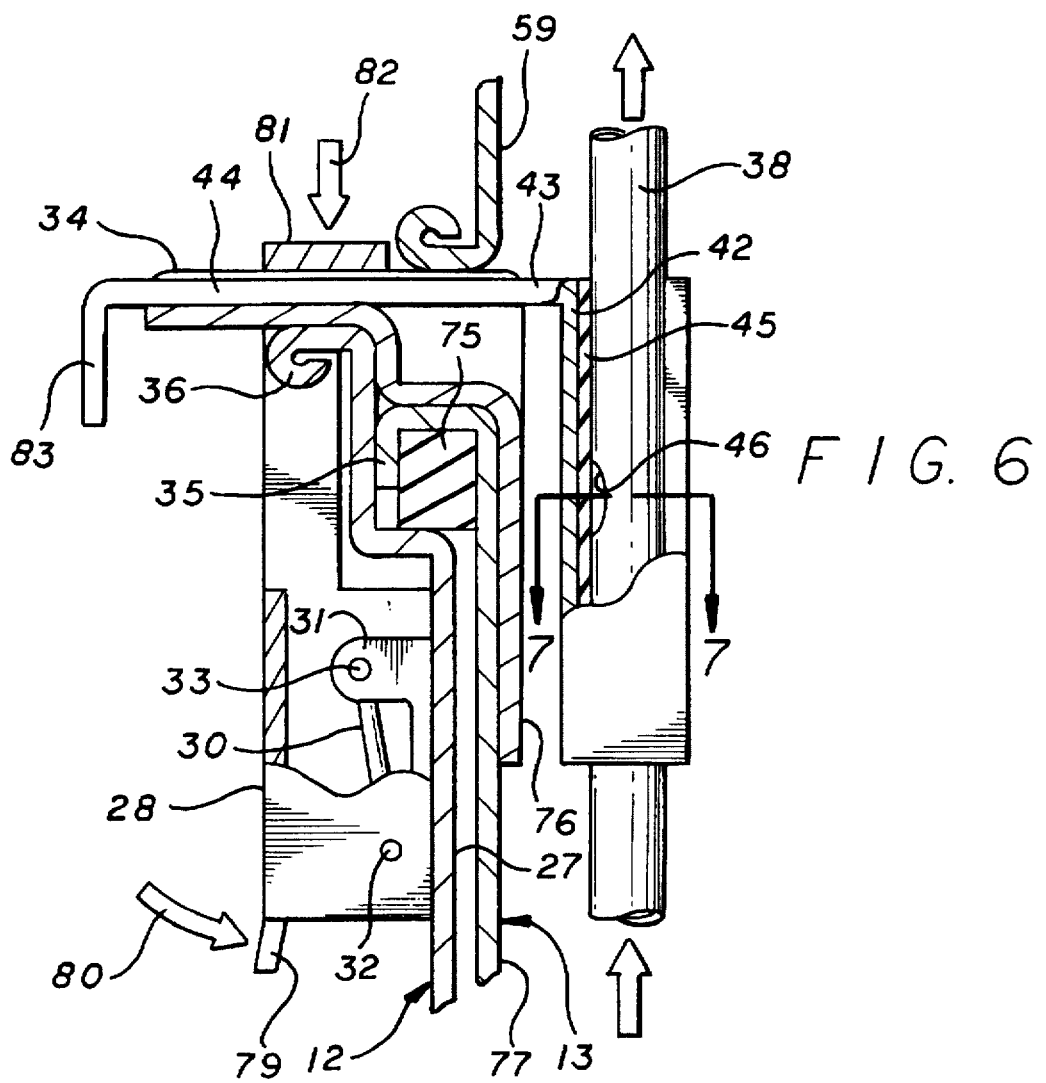
FIG. 6 is a view taken along line 6 of FIG. 3.

As seen in FIG. 6, each latch member, such as latch member 28, is pivotally connected via pivot rod 30 to flange 31 integral with side wall 27 of roasting pan 12. That is, member 28 pivots about points 32, 33 (see also FIG. 17) to selectively move the same into engagement with latch portion 34 of bracket 76 mounted to basting pan 13. As seen in FIG. 6, the upper rim 36 of roasting pan 12 is curved in cross-section.

The lip or rim 35 of basting pan 13 rests on top of the lip or rim 36 of pan 12 so that the bottom wall 18 of pan 13 is spaced from the bottom wall 37 of pan 12 a predetermined distance as seen in FIG. 3.

Figure 7:
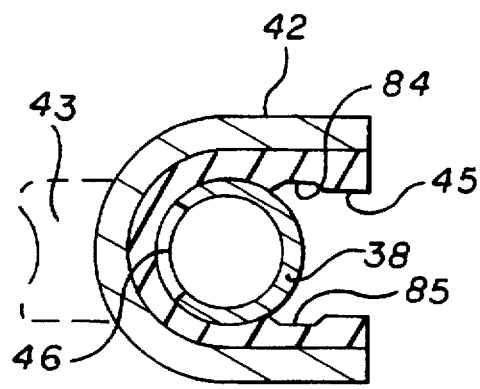
FIG. 7 is a view taken along lines 7—7 of FIG. 6.

As seen in FIGS. 3, 9, and 11, a pair of hollow delivery tubes 38, 39 extend through spaced openings 40, 41, respectively, in bottom wall 18 of pan 13. An apertured resilient seal 42 (see FIG. 9) is mounted in each opening 40, 41 for sealing the respective tube 38 or 39 therein. As seen in FIG. 3, each tube 38, 39 terminates at its lower end a short distance above bottom wall 37 of pan 12 for reasons to be discussed. As seen in FIGS. 6, 8, and 11, each tube 38, 39 extends through a U-shaped member 42 (see also FIG. 7) integral with the handle 43 of valve member 44 (FIG. 6). A like configured resilient sleeve 45 (see also FIG. 7) abuts against the interior of member 42 and against tube 38 as seen in FIGS. 6 and 7. Each tube 38, 39 has an opening 46 (see FIG. 6) therethrough for reasons to be discussed.

Figure 5:
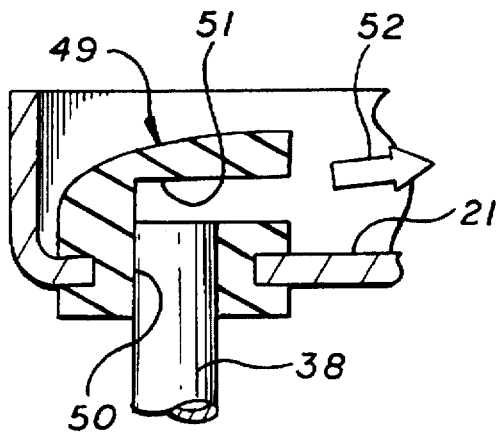
FIG. 5 is a view taken along line 5 of FIG. 3.
Figure 16:
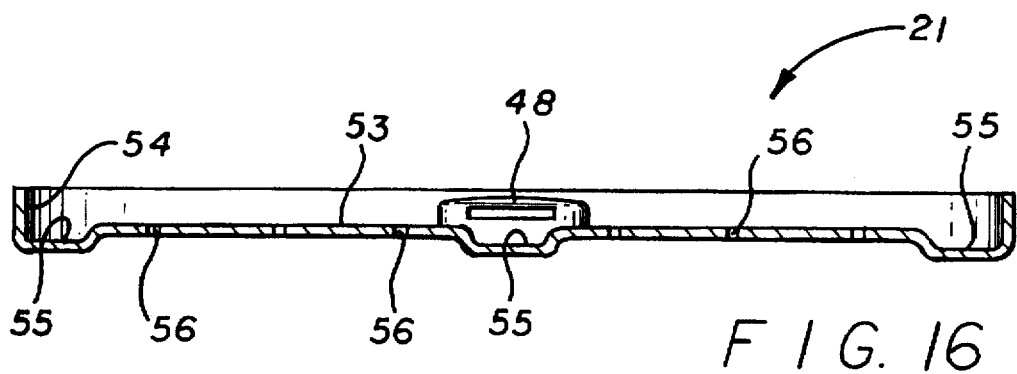
FIG. 16 is a view taken along lines 16—16 of FIG. 11.

Drip pan 21 (FIG. 11) has a pair of spaced openings 47, 48 therethrough for receiving the upper ends of the tubes 38, 39 therethrough (see FIG. 3). As seen in FIG. 5, each opening 47, 48 has a resilient diverter 49 mounted thereon having an opening 50 through which the upper end of each tube, such as tube 38, extends and fits therein, the terminal end opening into a slot 51 formed in diverter 49 for directing or diverting fluids in the direction of arrow 52. As seen in FIG. 11, the drip pan 21 includes a generally oval-shaped main body portion 53 surrounded by a peripheral upstanding rim 54. Body portion 53 includes a plurality of spaced lowered portions 55 (see FIG. 16) of varying configurations and dimensions. The entire pan 21 includes a plurality of small spaced orifices 56 therethrough. As seen in FIG. 3, drip pan 21 rests on top of bail portions 22, 23 of handles 19, 20, respectively.

Cover 24 (FIG. 11) includes a main body portion 57 having a peripheral integral side wall 58 and an outwardly extending peripheral rim 59. A notch 60 is provided on each side of rim 59 for receiving member 34 therethrough. A pair of spaced handles 61, 62 (see FIG. 3) are provided on wall 58.

Referring again to FIG. 3, valving means 63 is provided inside of basting pan 13 centrally located in the bottom wall 18 thereof. Valving means 63 includes a main body portion 64 (FIG. 2) forming a housing open at top and bottom. That is, the main body portion 64 is integral with bottom wall 18, the opening 65 therethrough providing the open top of main body portion 64. An elongated pin 66 extends through aligned holes 67, 68 in main body portion 64 having an enlarged head 69 for grasping the same. In this manner, pin 66 may be pulled out of holes 67, 68 to provide access to the interior of main body portion 64 to remove floating valve 70 therefrom for cleaning. Valve 70 has a main lower body portion 71 and an integral upper body portion 72 of lesser diameter than main body portion 71. A resilient O-ring 73 is provided encircling upper body portion 72. Both body portions 71, 72 may be round in cross-section. Finally, a removable filter mesh screen 74 of any suitable filter material is secured to wall 18 closing off opening 65.

Figure 17:
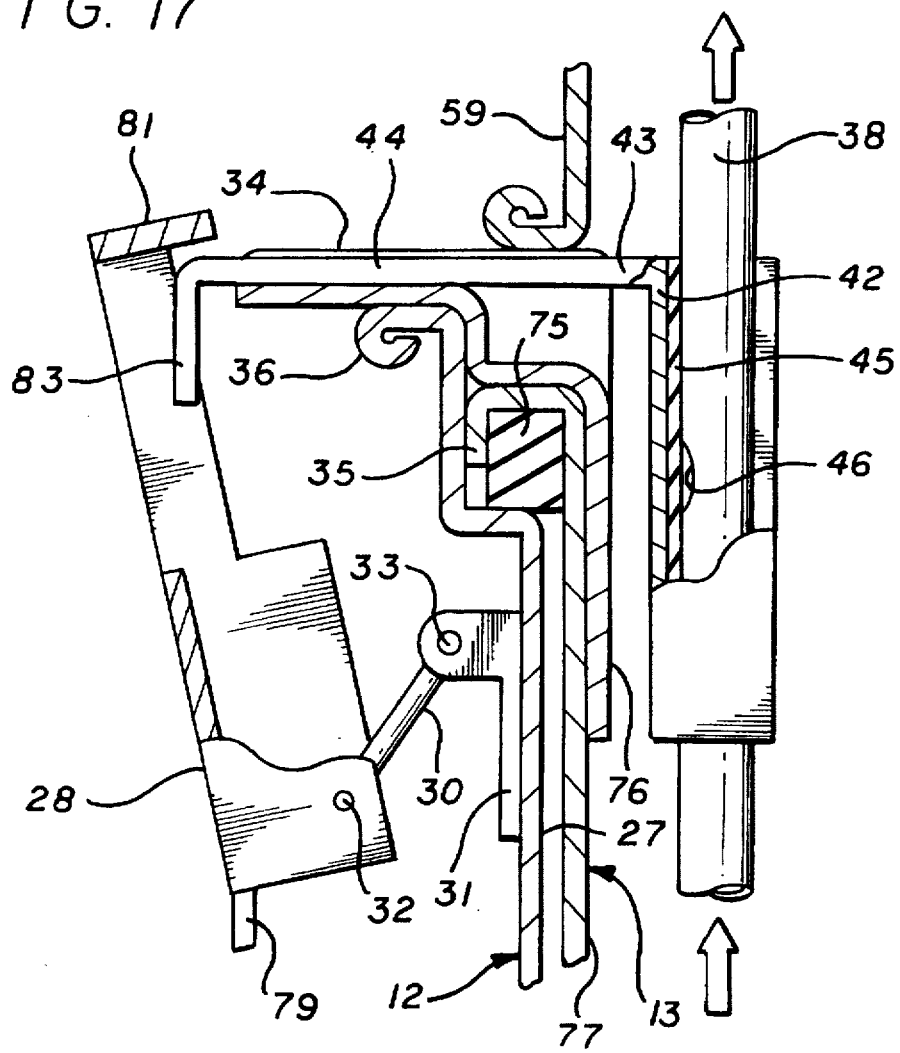
FIG. 17 is a view similar to FIG. 6 illustrating opening of the latch thereof.

Referring again to FIGS. 6 and 17, a resilient peripheral seal member 75 extends about rim 35 thereby disposed between rim 36 of roasting pan 12 and rim 35 of basting pan 13. Bracket 76 is mounted to the inner wall 77 of basting pan 13 overlying rim 35 of pan 13 and rim 36 of pan 12. Rim 59 of cover 24 thus rests on top of the upper latch portion 34 of bracket 76. Latch member 28 thus pivots from the open position of FIG. 17 to the lock position of FIG. 6. That is, pushing in on extension portion 79 of latch member 28 in the direction of arrow 80 pivots the same about points 32, 33 and raises latch member 28 and moves upper latch portion 81 of latch member 28 opposite the direction of arrow 80 (FIG. 6) as seen in FIG. 17 thereby releasing latch member 28 from engagement with latch portion 34. When operation is reversed, latch member 28 latches to latch portion 34.

As seen in FIG. 6, valve handle 43 is integral with valve member 44 which terminates in a downwardly extending portion 83 for easy in grasping the same. Valve member 44 slides within flange 78 so that, by pushing inwardly, members 42, 45 are moved from the FIG. 10 position to the FIG. 7 position. This selectively opens and closes opening 46 in tubes 38, 39 via engagement and disengagement of resilient member 45 for reasons to be discussed. To assist in this, a pair of elongated notches 84, 85 are provided on opposite sides of member 84 so that tube 38, in FIG. 7, may move to the notched position shown in FIG. 10.

In operation, the food desired to be roasted, such as turkey 86 in FIG. 3, is placed on top of rack 15, drip pan 21 is placed on top of the rack 15, the cover 24 is placed on top of basting pan 13 nestling in pan 12, and the latch member 28 is latched.

As the roaster 10 is heated, the liquid 87 (FIG. 3) in pan 12 heats up but has no way to evaporate. Steam is eventually created since there is no disposition for the heat being generated. Valve 70 lifts in the direction of arrow 88 and closes off opening 65 (FIG. 2) and fluid begins to rise within tubes 38, 39.

Figure 4:
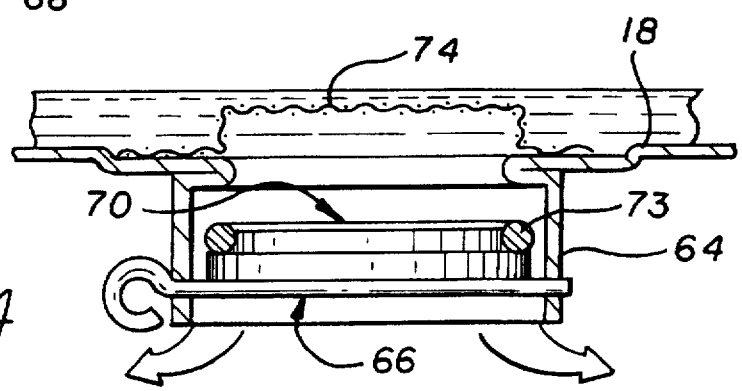
FIG. 4 is a view similar to FIG. 2 illustrating an open position of the valve.

Tubes 38, 39 may be about 10" in height. Steam goes up the tubes and pressure within the area below pan 13 and above wall 37 drops down to zero. Valve 70 now opens (FIG. 4). The liquid therein never reaches boiling (it may go to about 99° C.). The liquid again is heated up raising valve 70 closing off the opening 65 and again creating steam that rises in tubes 38, 39. This cycle takes place about every 5 to 10 minutes. About one to two liters of liquid is carried up along with the steam each time the steam rises in tubes 38, 39. This ejects the liquid in the direction of arrow 52 in FIG. 5 across drip pan 21 allowing the liquid to percolate down through perforations 56 thereby basting the turkey. The lower portions 55 of pan 21 aid in resisting warpage of pan 21 due to the heat being generated and cut down the area in which liquid flows down over the turkey. As the liquid collects in portions 55 and begins to come in faster moving to the higher level of pan 21, there is always a full pattern of liquid disposed over the turkey.

When one pushes in on valve 44, hole 46 is sealed since tube 38 is in the FIG. 7 position. All the liquid goes up tubes 38, 39 to pan 21 and begins dripping. However, when valve 44 is pulled back, e.g., about ⅛", thereby opening hole 46 (see FIG. 10), basting is stopped. The cycling is continued but the liquid stays in the basting pan 13 and is not carried up to the drip pan 21. This enables one to brown the roast, if desired.

Silicone materials may be used for the resilient parts. Tubes 38, 39 may be of steel. Valve 70 may be of any suitable material. Rack 14 allows one to lift the roast out of the pan 13 and acts as a balance for the drip pan 21.

If one wished to change the basting cycle of the roaster 10 of FIG. 1, the baffle pan 100 shown in FIGS. 12 to 15 may be used. Pan 12 of FIG. 11 is adapted to sit inside of pan 100. Pan 100 has a planar bottom wall 101 surrounded by an upstanding peripheral wall 102. Wall 102 has a plurality of spaced rectangularly shaped openings therethrough.

Figure 2:
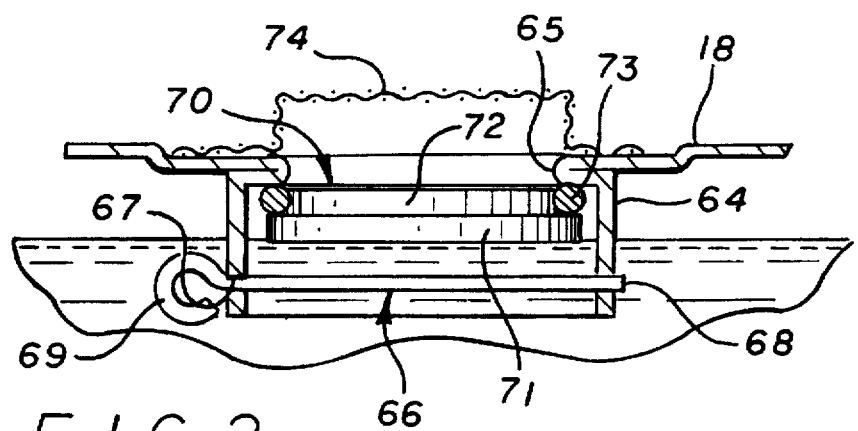
FIG. 2 is an elevational view, partly in section, illustrating a closed position of the valve of the roaster of FIG. 1.

As seen in FIG. 13, the wall 102 has three plies, an outer and inner ply 104, 105, respectively, of metal or the like, sandwiching therebetween an insulating layer 106. Opening 103 is actually three aligned openings through plies 104, 105 and layer 106. As seen in FIG. 2, a lever 107 extends through slot 108 in outer wall or ply 104 and is connected to layer 106. When lever 107 is moved to the FIG. 14 position, layer 106 connected thereto moves closing off opening 103. Of course, any intermediate position may be used.

A plurality of spaced raised protuberances 109 are provided on bottom wall 101 to space the bottom wall 37 of pan 12 therefrom when resting thereon. Support legs 110 (FIG. 3) may also be provided underneath bottom wall 101 at spaced locations.

Bottom wall 101 may also have a plurality of openings, such as openings 111 (FIG. 12) therethrough with a rotatable wheel 112, having a like plurality of like configured openings 114 mounted via pivot pin 113 to bottom wall 101. As handle portion 115 is grasped to rotate wheel 112, openings 111 may be selectively opened or closed (partially or totally) as seen in FIG. 15. Completely closing the openings would stop basting completely. Partially opening the openings can control the basting cycle from about 5 to 20 minutes.

The overall height of supports 109 may be varied to space pan 12 from pan 102. This allows room for the air to circulate.

The tubes 38, 39 are removable for cleaning. Pin 66 can be removed to remove valve 70 for cleaning.

Thus, a summary of the operation of the roaster 10 is as follows. The bottom of the roasting pan 12 acts as a basting fluid supply chamber sealed off from the atmosphere except for tubes 38, 39. These tubes 38, 39 extend down into the liquid 87 in pan 12 opening a short distance, e.g., 1/16" or less, above the bottom of pan 12. Tubes 38, 39 open at top on to drip pan 21. The chamber in pan 12 below pan 13 and above bottom wall 37 of pan 12 is valve controlled by valve 63 when the valve 63 is open and the chamber fills with liquid 87 from the basting pan reservoir formed between the rack 21 and the basting pan 13. The liquid 87 rises above the open bottom of the tubes 38, 39 forming a trap, which liquid rises in the chamber until the valve 63 closes. At this time, the liquid 87 in the chamber, which is below boiling, begins to heat up forming pressure therein (since it can't evaporate due to the chamber being sealed) generating steam which pushes the liquid 87 in the chamber up the tubes 38, 39 and out over the top of the drip pan 21. This liquid drips down over the roast basting the same and drips back into the reservoir of basting pan 13. This continues until the liquid level of liquid 87 in the basting fluid supply chamber reaches the open bottom of the tubes 38, 39 at which point the pressure of the steam above the liquid 87 in the basting fluid supply chamber escapes up the tubes 38, 39 until the pressure in the chamber between the bottom of pan 13 and bottom wall 37 of pan 12 drops and the valve 63 opens. The cycle is then repeated.

Filter 74 keeps the juices strained and clean and prevents clogging of valve 63. An oven temperature of 350° F. to 400° F. is preferably maintained and, at these temperatures, the liquid 87 reaches a temperature of about 205° F. to 208° F. (below boiling). If desired, insulation may be sprayed on the underside of basting pan 13.

Although a particular embodiment of the invention is disclosed, variations thereof may occur to any artisan and the scope of the invention should only be limited by the scope of the appended claims. For example, although the self basting roaster has particular application of operation in the low heat environment of an oven, it could of course be used on top of a stove or range.

I claim:

1. A self basting roaster comprising:
   a roasting pan having a bottom wall and a peripheral side wall;
   a basting pan having a bottom wall and a peripheral side wall disposed internally of said roasting pan and spaced from the bottom wall of said roasting pan forming a space therebetween;
   a rack disposed in said basting pan having extension portions extending upwardly therefrom;
   a drip pan having an upper surface and a lower surface and a plurality of perforations therethrough mounted on top of said extension portions; and
   valving means between the bottom walls of said roasting pan and said basting pan communicating with the space between said basting pan and said roasting pan, said space being normally sealed off from the atmosphere except for liquid delivery means communicating at one end with the space between said roasting pan and said basting pan and at the other end with the upper surface of said drip pan for delivering liquid from said space over said drip pan and down through said perforations.

2. In the roaster of claim 1 wherein said liquid delivery means includes at least one tube open at top and bottom, said bottom being spaced at short distance above the bottom wall of said roasting pan and said top opening above said drip pan.

3. In the roaster of claim 2 wherein said short distance is about 1/16".

4. In the roaster of claim 2 wherein at least a pair of tubes are provided on opposite sides of said roaster.

5. In the roaster of claim 1 wherein said valving means includes a valve housing open at top and bottom mounted in the bottom wall of said basting pan having an opening therethrough, said valve housing having a float valve mounted therein adapted to seal off the opening through said valve housing.

6. In the roaster of claim 5 including a filter between said valve housing and said rack.

7. In the roaster of claim 1 including a diverter associated with the other end of said liquid delivery means for diverting liquid therefrom over said drip pan.

8. In the roaster of claim 1 wherein said drip pan has a plurality of spaced depressions therein.

9. In the roaster of claim 1 including liquid delivery shut-off means associated with said liquid delivery means for shutting off liquid flow from said space.

10. In the roaster of claim 9 wherein said liquid delivery means include at least one tubing having an elongated wall opening at one end into said space and at the other end above said drip pan, said shut-off means including an opening through the wall of said tubing and sealing means associated with said basting pan movable from a first position closing off said opening through the wall of said tubing to a second position opening the wall through said tubing.

11. In the roaster of claim 1 including convection heat control means associated with said roasting pan for controlling the amount of convection heat circulating above said roasting pan.

12. In the roaster of claim 11 wherein said control means includes a convection heat control pan receiving said roasting pan therein having a bottom wall spaced from the bottom wall of said roasting pan and an integral peripheral wall surrounding said side wall of said roasting pan and a plurality of openings through said peripheral wall of said convection heat control pan, and variable control means associated with said peripheral wall of said heat control pan for varying the size of said openings therethrough.

13. In the roaster of claim 12 including a plurality of said openings through said bottom wall of said heat control pan, and second variable control means associated with said bottom wall of said heat control pan for varying the size of said openings therethrough.

* * * * *